United States Patent
Cho

(10) Patent No.: US 11,180,007 B2
(45) Date of Patent: Nov. 23, 2021

(54) TAILGATE GUIDE BUMPER OF A VEHICLE

(71) Applicants: HYUNDAI MOTOR COMPANY, Seoul (KR); KIA MOTORS CORPORATION, Seoul (KR)

(72) Inventor: Ki-Hyun Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 140 days.

(21) Appl. No.: 16/661,708

(22) Filed: Oct. 23, 2019

(65) Prior Publication Data

US 2020/0180409 A1 Jun. 11, 2020

(30) Foreign Application Priority Data

Dec. 7, 2018 (KR) .................. 10-2018-0157415

(51) Int. Cl.
*B60J 5/10* (2006.01)
*B60Q 1/30* (2006.01)

(52) U.S. Cl.
CPC ............ *B60J 5/107* (2013.01); *B60J 5/105* (2013.01); *B60Q 1/30* (2013.01)

(58) Field of Classification Search
CPC .. B60J 5/10; B60J 5/105; B60Q 24/00; B60Q 1/30
USPC ................................. 296/146.8, 56
See application file for complete search history.

(56) References Cited

U.S. PATENT DOCUMENTS

| | | | |
|---|---|---|---|
| 3,008,174 A * | 11/1961 | Schonitzer | E05F 7/04 16/85 |
| 5,482,348 A * | 1/1996 | Mass | E05F 5/022 16/82 |
| 5,549,351 A * | 8/1996 | Park | B60J 5/00 16/86 B |
| 5,802,671 A * | 9/1998 | Ikuma | E05F 5/022 16/82 |
| 6,676,201 B2 * | 1/2004 | Im | B60J 5/101 16/82 |
| 7,014,258 B2 * | 3/2006 | Schubring | B60J 5/10 292/216 |
| 7,147,260 B2 * | 12/2006 | Eschebach | B62D 33/0273 296/57.1 |
| 2005/0253398 A1 * | 11/2005 | Schubring | E05F 5/022 292/1 |
| 2006/0200939 A1 * | 9/2006 | Schubring | E05F 7/04 16/86 R |

(Continued)

FOREIGN PATENT DOCUMENTS

KR 101519250 B1 5/2015

*Primary Examiner* — D Glenn Dayoan
*Assistant Examiner* — Kevin P Weldon
(74) *Attorney, Agent, or Firm* — Lempia Summerfield Katz LLC

(57) ABSTRACT

A tailgate guide bumper is to be installed between a tailgate that opens to a rear of a vehicle and a vehicle body of the vehicle to support the tailgate in a widthwise direction of the vehicle. The tailgate guide bumper includes a guide bumper member fastened to one side of the tailgate and a guide bumper supporting part configured to be in contact with the guide bumper member when the tailgate is closed to support load applied in a widthwise direction of the tailgate. The guide bumper member and the guide bumper supporting part are installed to be adjacent to a lamp installed at the rear of the vehicle.

14 Claims, 8 Drawing Sheets

(56) References Cited

U.S. PATENT DOCUMENTS

2006/0242789 A1* 11/2006 Mokashi ................ E05F 5/022
                                                    16/85
2006/0244286 A1* 11/2006 Meyers .................... E05F 7/04
                                                   296/146.1

* cited by examiner

TAILGATE GUIDE BUMPER OF A VEHICLE

CROSS-REFERENCE TO RELATED APPLICATIONS

This application claims priority to Korean Patent Application No. 10-2018-0157415, filed on Dec. 7, 2018, which is incorporated herein by reference in its entirety.

BACKGROUND OF THE DISCLOSURE

Field of the Disclosure

The present disclosure relates to a tailgate guide bumper of a vehicle which prevents a movement of a tailgate of a vehicle, and more particularly to a tailgate guide bumper configured to be easily mounted or installed and to support a tailgate at a point where load is most greatly applied in a widthwise direction of the vehicle.

Description of Related Art

A tailgate is installed on the rear of a vehicle to enable a burden, i.e., cargo, luggage, baggage, a load, or the like to be loaded into or unloaded from the vehicle. For example, a vehicle such as a sport utility vehicle (SUV), a hatchback, a van, or the like is provided with a tailgate, which is installed on a vehicle body to be opened to the rear of the vehicle, and allows a burden to be loaded into or unloaded from the vehicle using the tailgate.

Generally, the tailgate is installed in such a manner that an upper end of the tailgate is hingedly or pivotally connected to the vehicle body.

Since the upper end of the tailgate is connected to the vehicle body, a shifting or small movement of the tailgate may occur while a vehicle is travelling. A guide bumper is installed to prevent this movement from occurring.

As illustrated in FIGS. 1 and 2, a tailgate guide bumper 120 of a vehicle according to the prior art is installed on a lower portion of a tailgate 112, particularly on a portion adjacent to a lower end.

As illustrated in FIGS. 2 and 3, the tailgate guide bumper 120 according to the above-described prior art includes a first member 121 fastened to a tailgate inner panel 112a, wherein the tailgate inner panel 112a and a tailgate outer panel 112b constitute the tailgate 112, and a second member 122 fastened to a vehicle body 111. When the tailgate 112 is closed, the first member 121 is constrained by the second member 122 to prevent the tailgate 112 from being moved in a direction indicated by the arrow L.

In the tailgate guide bumper 120 of the vehicle according to the prior art as described above, however, the first member 121 and the second member 122 should be fastened to each other by a plurality of fastening bolts 121a and 122a so that the first member and the second member can exhibit sufficient rigidity. Therefore, there is a problem that the man-hours for an assembly process is increased for installing the tailgate 112. The first member 121 is fastened to the tailgate inner panel 112a of the tailgate 112 by the two fastening bolts 121a. The second member 122 is fastened to the vehicle body by the three fastening bolts 122a. The above fastening processes are performed on both left and right sides of a vehicle 1, respectively. Therefore, a great number of man-hours for an assembly process to install tailgates are required for fastening the fastening bolts 121a and 122a.

In addition, a fastening direction in the direction of the arrow M in which the fastening bolts 121a and 122a are fastened and a load applying direction in the direction of the arrow V are perpendicular to each other. Thus, in order to secure rigidity of a portion on which the fastening bolts 121a and 122a are fastened, additional reinforcing members 121b and 122b are required.

Furthermore, the guide bumper 120 is installed on a portion adjacent to the lower end of the tailgate 112, which is below a lamp 113. Thus, the guide bumper is spaced apart from a portion where load caused by a movement of the tailgate 112 is most greatly applied, so that the load in the direction L caused by the movement cannot be effectively reduced.

The contents described in the Description of Related Art section are to help in the understanding the background of the present disclosure and thus may include what is not previously known to those of ordinary skill in the art to which the present disclosure pertains.

SUMMARY OF THE DISCLOSURE

One object of the present disclosure is to solve the above-mentioned problems. Another object of the present disclosure is to provide a tailgate guide bumper of a vehicle which employs a part of a housing of a lamp as a part of a guide bumper to enable the guide bumper to be easily assembled.

Another object of the present disclosure is to provide a tailgate guide bumper of a vehicle which can effectively prevent the tailgate from being moved by installing a guide bumper at a point to which load applied to the tailgate is most greatly applied.

In order to achieve the above-mentioned objects, a tailgate guide bumper of a vehicle according to the present disclosure is installed between a tailgate configured to be opened to the rear of the vehicle and a vehicle body of the vehicle to support the tailgate in a widthwise direction of the vehicle. The tailgate guide bumper may include a guide bumper member fastened to one side of the tailgate and a guide bumper supporting part configured to be in contact with the guide bumper member when the tailgate is closed to support load applied in a widthwise direction of the tailgate. The guide bumper member and the guide bumper supporting part may be installed to be adjacent to a lamp installed at the rear of the vehicle.

The guide bumper member and the guide bumper supporting part may be installed to be spaced apart from a lower end of the tailgate by a predetermined height.

The guide bumper supporting part may be formed by extending, i.e., as an extension of, a lamp housing of the lamp installed at the rear of the vehicle body.

The guide bumper supporting part may be formed to be extended from the lamp housing, which is positioned inside an extension panel constituting the vehicle body, towards a side outer panel.

An end portion of the guide bumper supporting part may be adjacent to the side outer panel.

A fastening bolt for fastening the guide bumper supporting part to the vehicle body may be fastened to an inner side of a portion, which is adjacent to the guide bumper member, of the guide bumper supporting part.

The fastening bolt may be fastened in the widthwise direction of the vehicle.

The guide bump supporting part may be formed from a plastic material.

The guide bumper member may be fastened to an inner panel of the tailgate.

The guide bumper member may be formed from a rubber material and a steel material.

A fastening bolt may pass through a center of the guide bumper member to fasten the guide bumper member to the tailgate inner panel.

The fastening bolt may be fastened in the widthwise direction of the vehicle.

The lamp may be a rear combination lamp.

DESCRIPTION OF SPECIFIC EMBODIMENTS

Figure 1:
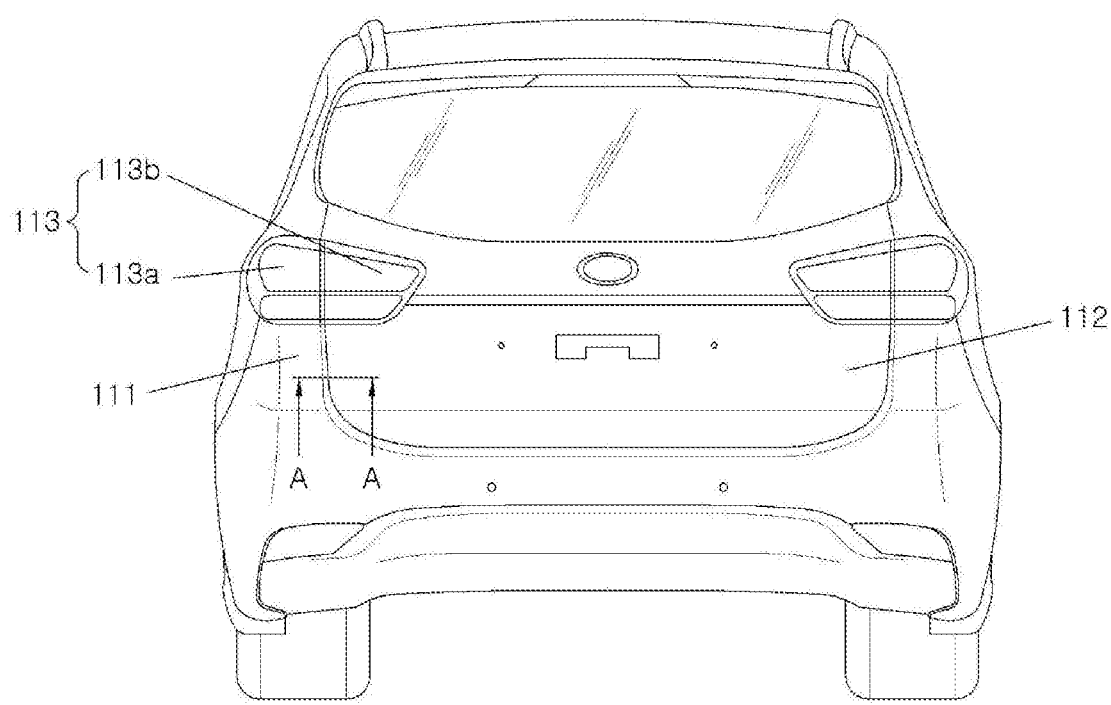
FIG. 1 is a view illustrating a state in which a tailgate is installed on a vehicle.
Figure 2:
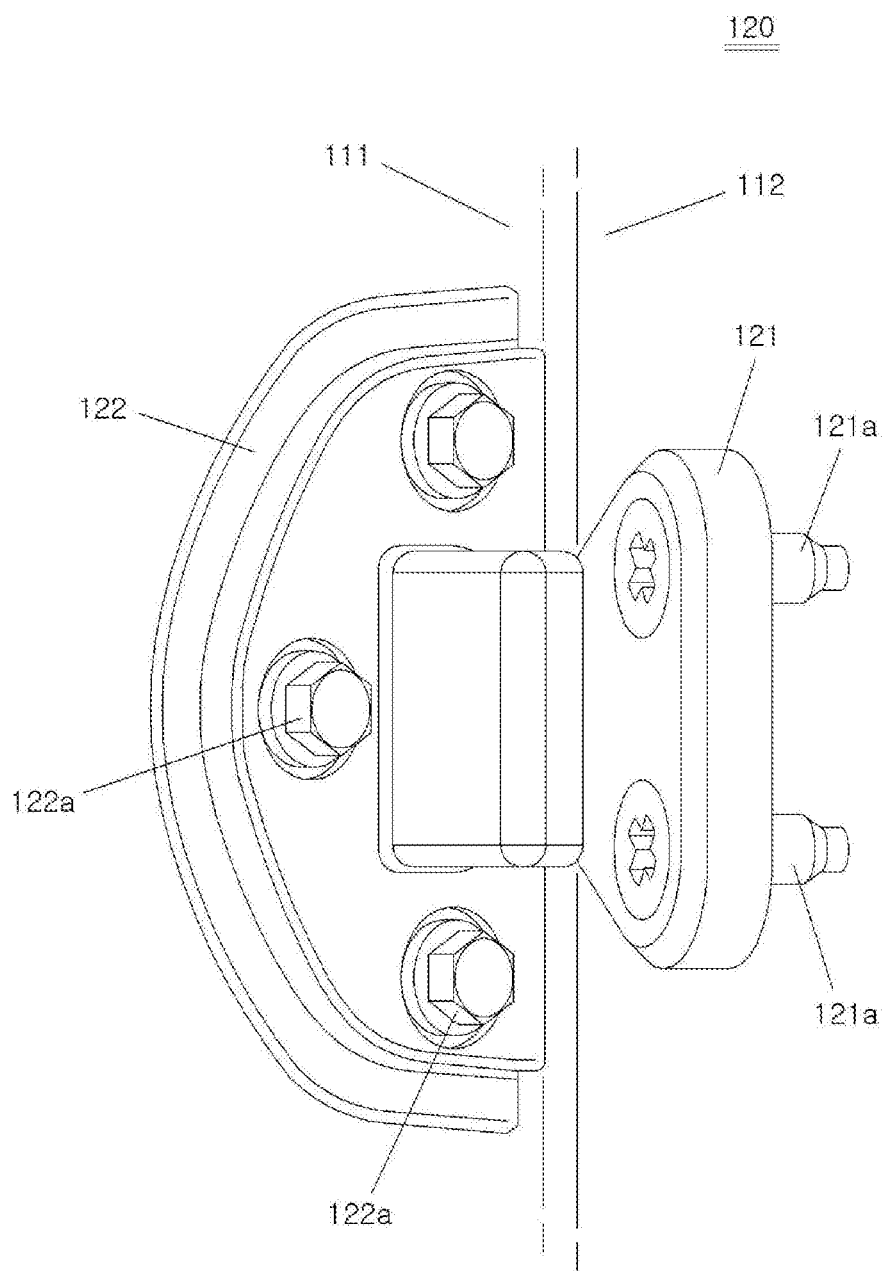
FIG. 2 is a perspective view illustrating a tailgate guide bumper of a vehicle according to the prior art.
Figure 3:
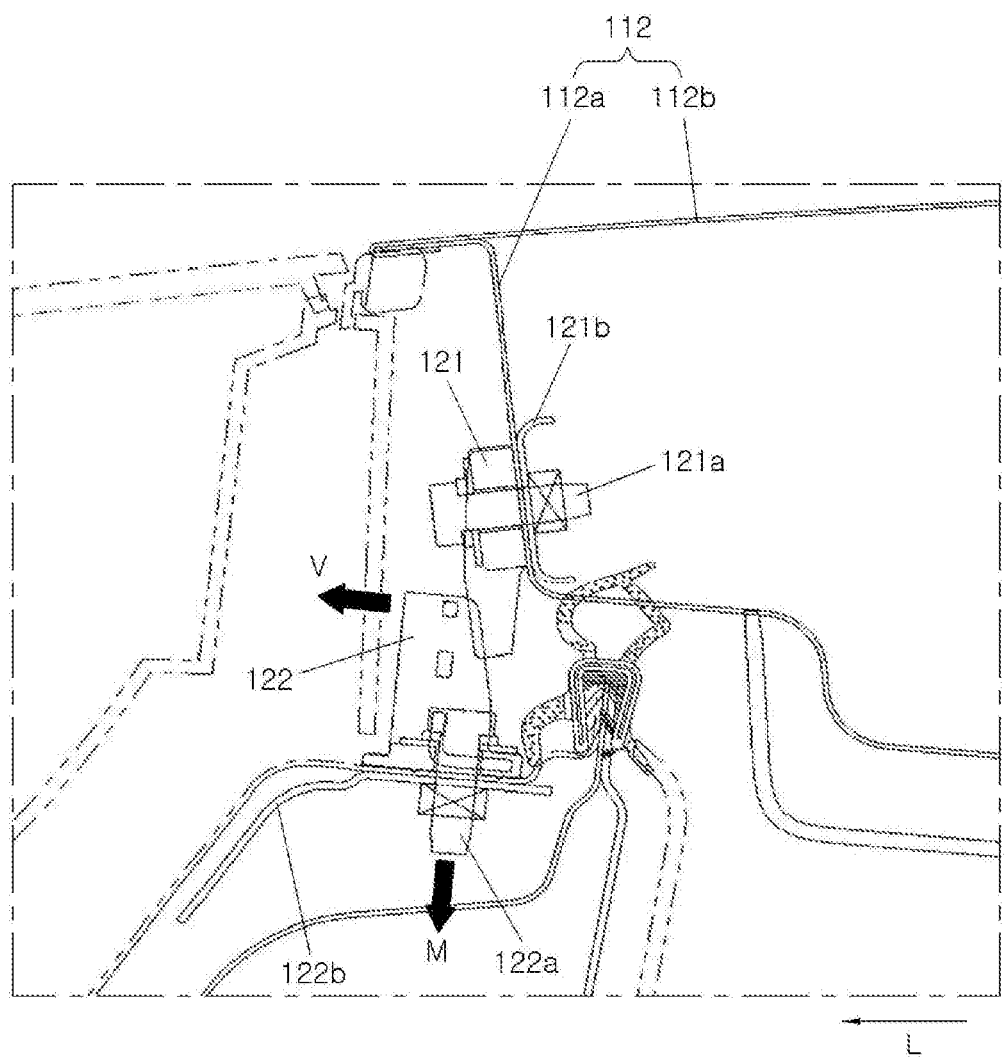
FIG. 3 is a cross-sectional view taken along line A-A in FIG. 1 that depicts a state in which the tailgate guide bumper of a vehicle according to the prior art is installed.
Figure 4:
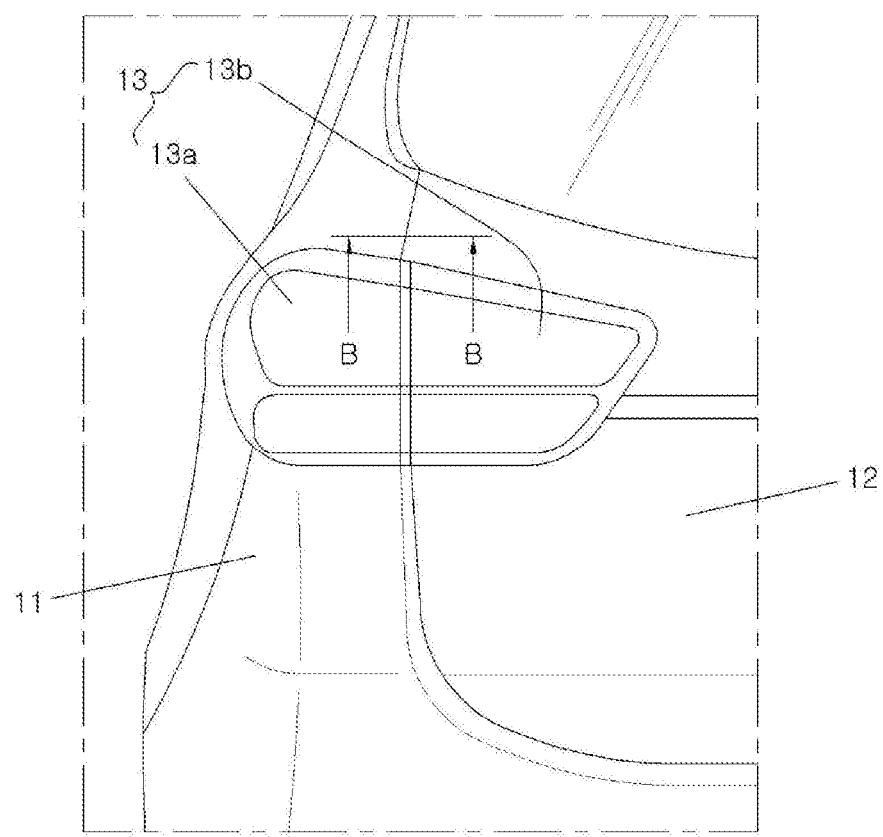
FIG. 4 is a view illustrating a portion of a vehicle at which a tailgate guide bumper according to the present disclosure is installed on the vehicle.

Hereinafter, embodiments of the present disclosure are described in detail with reference to the accompanying drawings. However, in the following description and the accompanying drawings, a detailed description of well-known functions or configurations that can obscure the subject of the present disclosure have been omitted. In addition, it should be noted that the same components are denoted by the same reference numerals as much as possible throughout the drawings.

Hereinafter, a tailgate guide bumper of a vehicle according to the present disclosure is described in detail with reference to the accompanying drawings.

A tailgate guide bumper of a vehicle according to the present disclosure is installed between a tailgate 12 configured to be opened to the rear of a vehicle 1 and a vehicle body 11 of the vehicle 1 to support the tailgate 12 in a widthwise direction of the vehicle 1. The tailgate guide bumper includes a guide bumper member 21 fastened to one side of the tailgate 12 and a guide bumper supporting part 13aa configured to be in contact with the guide bumper member 21 when the tailgate 12 is closed to support load applied in a widthwise direction of the tailgate 12. In this example, the guide bumper member 21 and the guide bumper supporting part 13aa are installed to be adjacent to a lamp 13 installed at a rear side of the vehicle.

The guide bumper member 21 is installed on a side surface of the tailgate 12.

When the tailgate 12 is closed, the guide bumper member 21 is interposed between the tailgate 12 and the vehicle body to prevent the tailgate 12 from being moved.

The guide bumper member 21 is formed to have a predetermined volume and is installed on the side surface of the tailgate 12. In particular, the guide bumper member 21 is fastened to an inner panel 12a of the tailgate 12.

Figure 6:
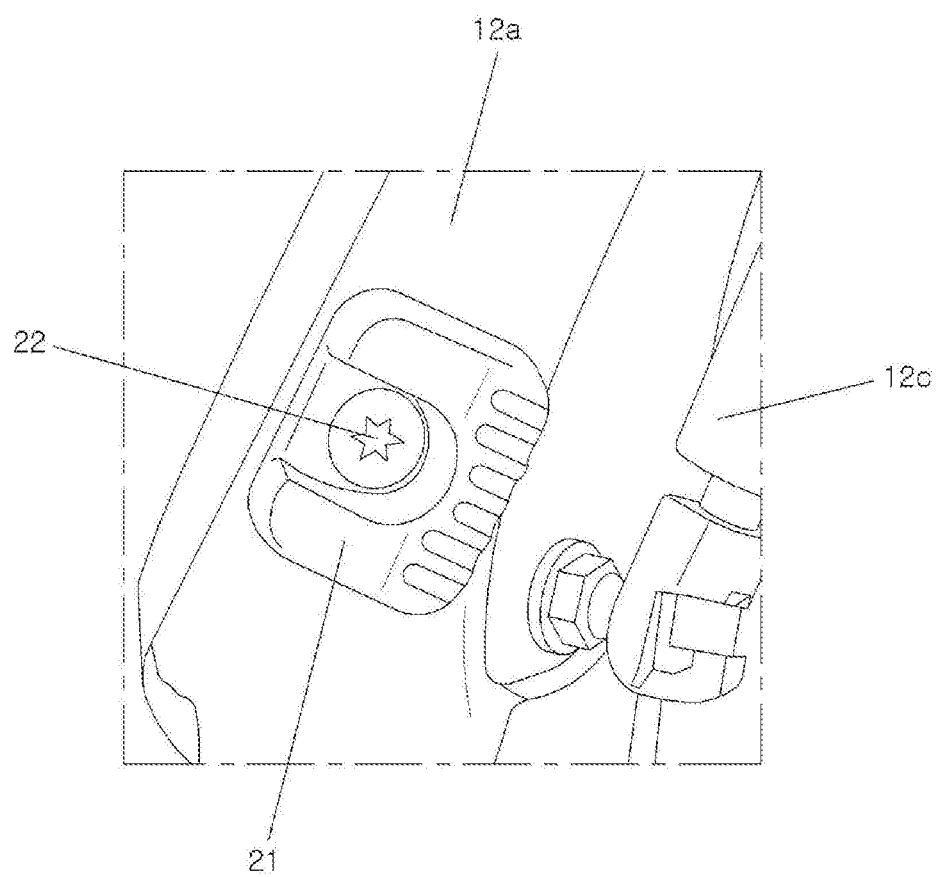
FIG. 6 is a perspective view illustrating a state in which the tailgate guide bumper of a vehicle according to the present disclosure is installed on a tailgate.

When the guide bumper member 21 is fastened to the inner panel 12a, the guide bumper member 21 is fastened to the inner panel 12a by using a fastening bolt 22. The guide bumper member 21 is mounted at a central portion thereof in a one-point manner by using the one fastening bolt 22 (see FIG. 6). Since the guide bumper member 21 is mounted at one point, the number of components required for an assembly process is reduced. This reduces a weight of the tailgate guide bumper and the man-hours required for an assembly process.

Figure 8:
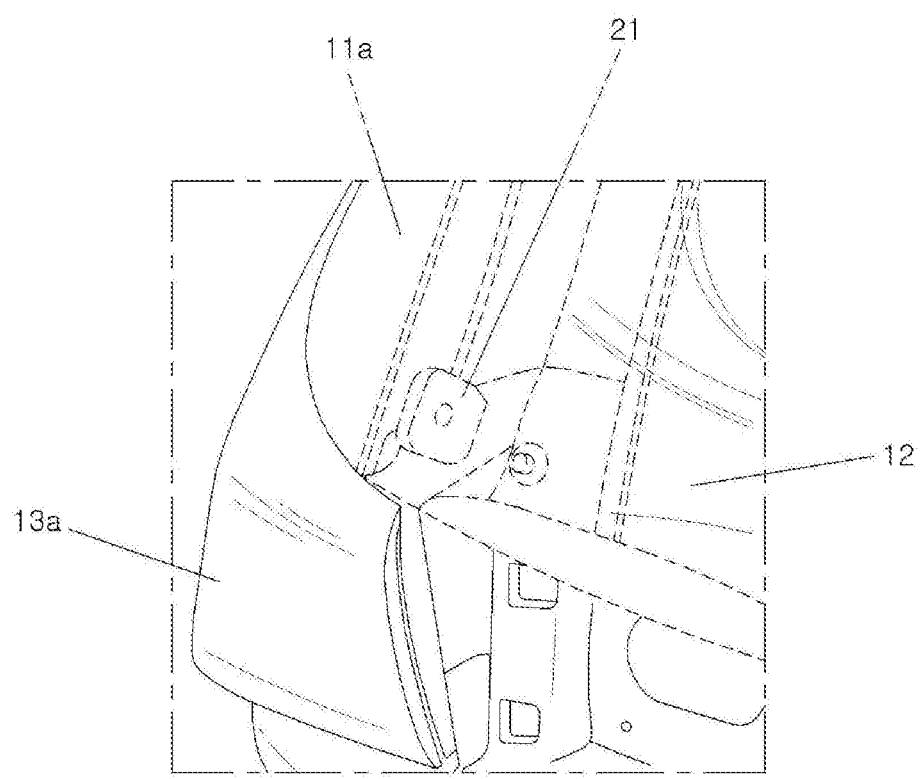
FIG. 8 is a perspective projection view illustrating a state in which the tailgate to which the tailgate guide bumper of a vehicle according to the present disclosure is applied is closed.

When the tailgate 12 is closed, the guide bumper supporting part 13aa becomes in contact with the guide bumper member 21 to support both ends of the tailgate 12 (see FIG. 8).

The guide bumper supporting part 13aa is integrally formed with a lamp housing 13a and the guide bumper member 21 is configured to be in contact with the guide bumper supporting part 13aa. Thus, the guide bumper member 21 is installed at an intermediate portion of the tailgate 12.

In the prior art, the guide bumper is installed on the lower end of the tailgate 112. However, in the present disclosure, since the guide bumper supporting part 13aa is integrally formed with the lamp housing 13a, the guide bumper member 21 is installed at the intermediate portion of the tailgate 12. The intermediate portion of the tailgate 12 is a point at which the load applied to the tailgate 12 becomes maximum when the vehicle 1 is being driven. In the present disclosure, the guide bumper member 21 and the guide bumper supporting part 13aa are installed on this portion.

Figure 7:
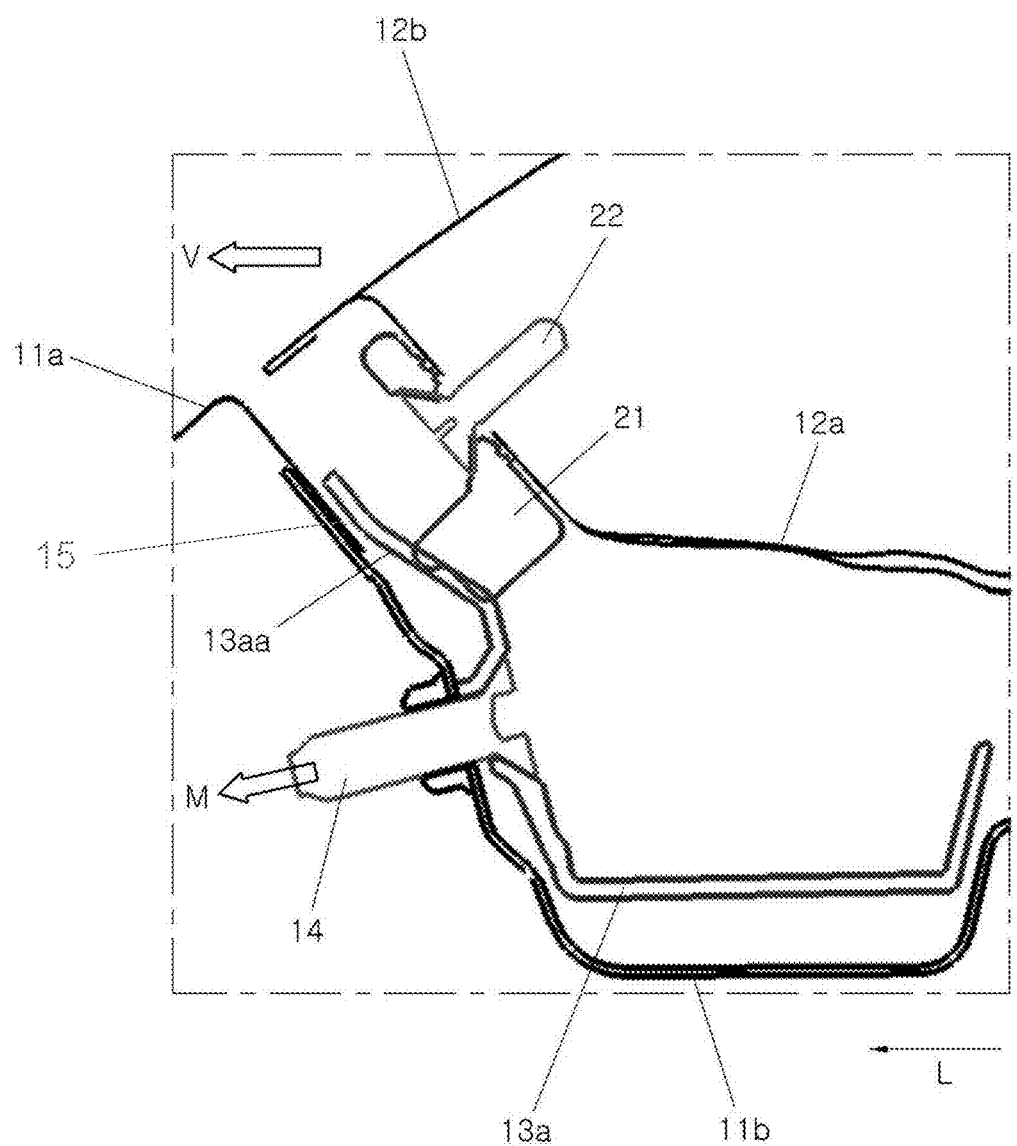
FIG. 7 is a cross-sectional view taken along line B-B in FIG. 4 that depicts a state in which the tailgate guide bumper of a vehicle according to the present disclosure is installed.

The guide bumper supporting part 13aa is installed on a portion at a predetermined height from the lower end of the tailgate 12, i.e., on a portion on which the rear combination lamp 13 is installed. In particular, the guide bumper supporting part 13aa is formed to be extended from the lamp housing 13a, which corresponds to the vehicle body, of the lamp 13 provided at the rear side of the vehicle body. The lamp housing 13a corresponds to the vehicle body and a lamp housing 13b corresponds to the tailgate 12. In other words, as illustrated in FIG. 7, the guide bumper supporting part 13aa is formed to be extended from the lamp housing 13a, which is positioned inside an extension panel 11b constituting the vehicle body, towards a side outer panel 11a. The guide bumper supporting part 13aa is formed to be extended from the lamp housing 13a towards the side outer panel 11a in a state in which it is spaced apart from the extension panel 11b. The guide bumper supporting part 13aa is formed to allow an end portion 15 thereof to be adjacent to the side outer panel 11a.

In order to fasten the guide bumper supporting part 13aa to the vehicle body side, i.e., to the extension panel 11b, the guide bumper supporting part 13aa is fastened to the extension panel 11b with the fastening bolt 14. A direction in which the fastening bolts 14 is fastened is allowed to approximately coincide with a widthwise direction (direction L) of the vehicle. A mounting direction M of the fastening bolt 14 is similar to an applied load direction V in which load is applied when the vehicle is travelling. Thus, an additional reinforcing member for securing rigidity of a portion to which the fastening bolt 14 is fastened is not necessary.

Figure 5:
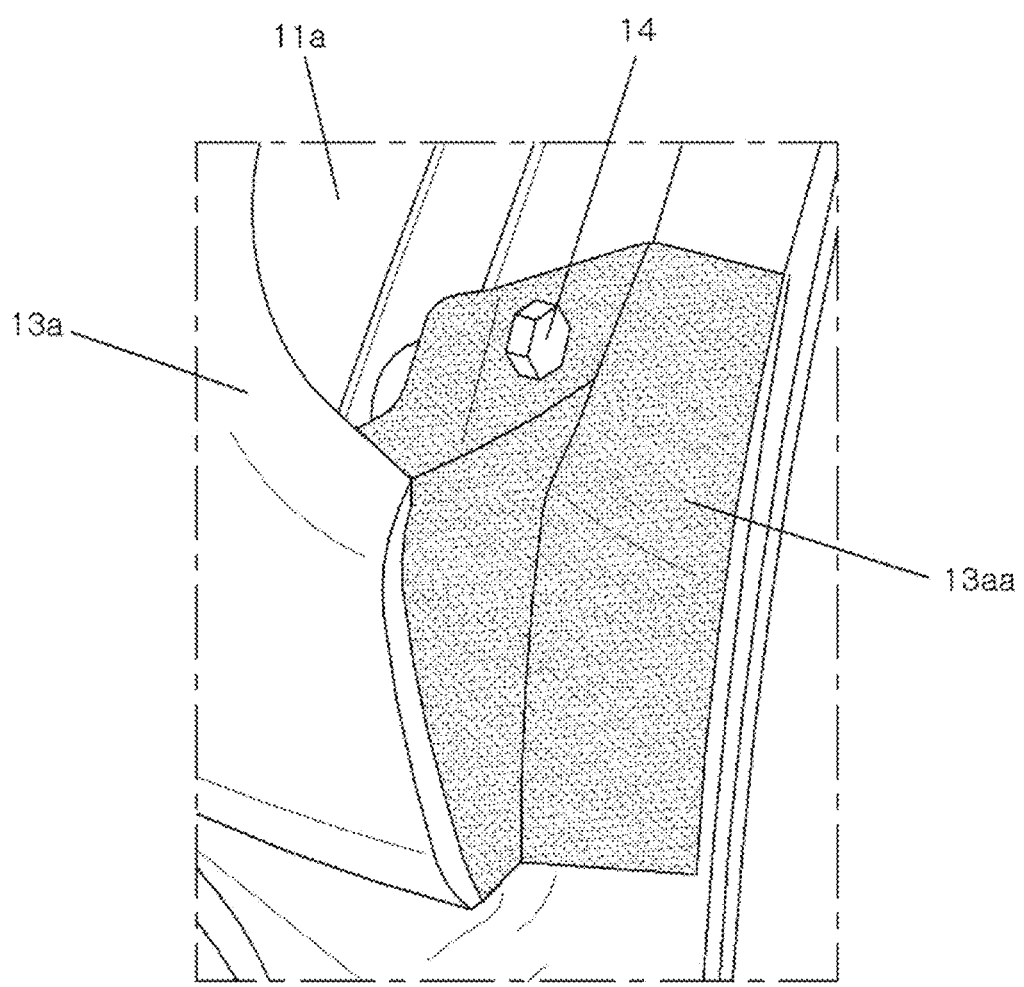
FIG. 5 is a perspective view illustrating a lamp housing in the portion of the vehicle at which the tailgate guide bumper according to the present disclosure is installed.

In particular, the fastening bolt 14 is mounted on a center of the guide bumper supporting part 13aa in the one-point manner (see FIG. 5). In the prior art, the guide bumper member is fastened with a plurality of fastening bolts. In the present disclosure, however, the guide bumper supporting part 13aa is fastened with only one fastening bolt 14. Thus, the weight of the tailgate guide bumper and the man-hours required for the assembly process are reduced.

The guide bumper supporting part 13aa may be formed from a plastic material, such as polycarbonate-acrylonitrile butadiene styrene (PC-ABS). PC-ABS is a composite material of polycarbonate (PC) and acrylonitrile butadiene styrene (ABS) and is one of a number engineered thermoplastic resins having high impact resistance. By manufacturing the guide bumper supporting part 13aa using PC-ABS as a raw material, even if the load is repeatedly applied to the guide bumper supporting part 13aa when the tailgate 12 is closed, the guide bumper supporting part can support the tailgate 12.

Meanwhile, the guide bumper member 21 is made of a rubber material and a steel material. In one example, the rubber material is thermoplastic elastomer (TPE). For example, the guide bumper member 21 may be manufactured by injection molding TPE in a state in which steel is insert molded into the TPE part. TPE can be molded like a plastic, which becomes flexible at a high temperature, and is a polymeric material, which exhibits properties of elastomer at room temperature. Since TPE is employed as the raw material of the guide bumper member 21, in a case where the tailgate 12 is being closed, when the guide bumper member 21 is in contact with the guide bumper supporting part 13aa, shock is absorbed by the guide bumper member 21, thereby reducing noise. In addition, in a state in which the tailgate 12 is closed, the guide bumper member 21 is kept in contact with the guide bumper supporting part 13aa. The guide bumper member 21, which is an elastic body, absorbs the load applied, when the vehicle 1 is being driven, in the widthwise direction of the tailgate 12, thereby reducing shifting movements of the tailgate 12 in the widthwise direction.

Reference numerals 12b and 12c, which are not described above, represent a tailgate outer panel constituting the tailgate 12 and a gas cylinder provided to support the tailgate 12 when the tailgate 12 is opened, respectively.

According to the tailgate guide bumper of the vehicle of the present disclosure having the above-described structure, by employing a part of the lamp housing as the guide bumper, the inconvenience of fastening the members of the guide bumper to the vehicle body and the tailgate, respectively, is eliminated.

Further, the portion where the guide bumper is installed is located at the intermediate portion of the tailgate to match the portion or location where the load is most greatly applied in the direction L when the vehicle is travelling with the portion or location where the guide bumper is installed, so that movement of the tailgate is significantly reduced.

Although the embodiments have been described with a focus on novel features of the present disclosure applied to the various embodiments, it will be apparent to those of ordinary skill in the art that various deletions, substitutions, and changes in the form and details of the apparatus and method described above may be made without departing from the scope of the present disclosure. Accordingly, the scope of the present disclosure is defined by the appended claims rather than by the foregoing description. All modifications within the equivalent scope of the appended claims are embraced within the scope of the present disclosure.

What is claimed is:

1. A tailgate guide bumper of a vehicle, the tailgate guide bumper configured to be installed between a tailgate configured to be opened to a rear of the vehicle and a vehicle body of the vehicle to support the tailgate in a widthwise direction of the vehicle, the tailgate guide bumper comprising:
   a guide bumper member fastened to one side of the tailgate; and
   a guide bumper supporting part configured to be in contact with the guide bumper member when the tailgate is closed to support load applied in a widthwise direction of the tailgate,
   wherein the guide bumper member and the guide bumper supporting part are installed to be adjacent to a lamp installed at the rear of the vehicle, and
   wherein the guide bumper supporting part is formed by extending a lamp housing of the lamp installed at the rear of the vehicle body.

2. The tailgate guide bumper of claim 1, wherein the guide bumper member and the guide bumper supporting part are installed to be spaced apart from a lower end of the tailgate by a predetermined height.

3. The tailgate guide bumper of claim 1, wherein the guide bumper supporting part is formed to be extended from a lamp housing, the lamp housing positioned inside an extension panel constituting the vehicle body, and the guide bumper supporting part formed to be extended towards a side outer panel.

4. The tailgate guide bumper of claim 3, wherein an end portion of the guide bumper supporting part is adjacent to the side outer panel.

5. The tailgate guide bumper of claim 1, wherein a fastening bolt for fastening the guide bumper supporting part to the vehicle body is fastened to an inner side of a portion of the guide bumper supporting part, which is adjacent to the guide bumper member.

6. The tailgate guide bumper of claim 5, wherein the fastening bolt is fastened in the widthwise direction of the vehicle.

7. The tailgate guide bumper of claim 1, wherein the guide bump supporting part is formed from a plastic material.

8. The tailgate guide bumper of claim 1, wherein the guide bumper member is fastened to an inner panel of the tailgate.

9. The tailgate guide bumper of claim 1, wherein the guide bumper member is formed from a rubber material and a steel material.

10. The tailgate guide bumper of claim 1, wherein a fastening bolt passes through a center of the guide bumper member to fasten the guide bumper member to the tailgate inner panel.

11. The tailgate guide bumper of claim 10, wherein the fastening bolt is fastened in the widthwise direction of the vehicle.

12. The tailgate guide bumper of claim 1, wherein the lamp is a rear combination lamp.

13. A tailgate guide bumper of a vehicle, the tailgate guide bumper configured to be installed between a tailgate configured to be opened to a rear of the vehicle and a vehicle body of the vehicle to support the tailgate in a widthwise direction of the vehicle, the tailgate guide bumper comprising:
   a guide bumper member fastened to one side of the tailgate; and
   a guide bumper supporting part configured to be in contact with the guide bumper member when the tailgate is closed to support load applied in a widthwise direction of the tailgate, wherein the guide bumper member and the guide bumper supporting part are installed to be adjacent to a lamp installed at the rear of the vehicle, and wherein the guide bumper supporting part is formed to be extended from a lamp housing, the lamp housing positioned inside an extension panel constituting the vehicle body, and the guide bumper supporting part formed to be extended towards a side outer panel.

14. The tailgate guide bumper of claim 13, wherein an end portion of the guide bumper supporting part is adjacent to the side outer panel.

\* \* \* \* \*